US009343937B2

(12) United States Patent
Nakazono et al.

(10) Patent No.: US 9,343,937 B2
(45) Date of Patent: May 17, 2016

(54) ROTARY ELECTRIC MACHINE EQUIPPED WITH ROTOR CORE OF STEP SKEW STRUCTURE

(71) Applicant: DENSO CORPORATION, Kariya, Aichi-pref. (JP)

(72) Inventors: Junichi Nakazono, Okazaki (JP); Kiyokazu Futami, Obu (JP); Seiji Tachibana, Toyoake (JP)

(73) Assignee: DENSO CORPORATION, Kariya (JP)

( * ) Notice: Subject to any disclaimer, the term of this patent is extended or adjusted under 35 U.S.C. 154(b) by 208 days.

(21) Appl. No.: 14/028,919

(22) Filed: Sep. 17, 2013

(65) Prior Publication Data
US 2014/0084744 A1 Mar. 27, 2014

(30) Foreign Application Priority Data

Sep. 27, 2012 (JP) ................. 2012-214429

(51) Int. Cl.
H02K 21/12 (2006.01)
H02K 1/06 (2006.01)
H02K 1/28 (2006.01)
H02K 1/27 (2006.01)

(52) U.S. Cl.
CPC .............. *H02K 1/28* (2013.01); *H02K 1/2766* (2013.01)

(58) Field of Classification Search
CPC ................... H02K 1/27; H02K 1/28

USPC ............ 310/156.01, 156.08, 156.09, 156.45, 310/156.47, 216.003, 216.016, 216.018, 310/216.049, 216.116, 216.121, 216.123, 310/261.1
See application file for complete search history.

(56) References Cited

U.S. PATENT DOCUMENTS

| 2004/0222714 | A1* | 11/2004 | Usami et al. ................. 310/216 |
| 2005/0179334 | A1 | 8/2005 | Yoshinaga |
| 2010/0187944 | A1* | 7/2010 | Ossenkopp et al. ... 310/216.049 |
| 2012/0014823 | A1* | 1/2012 | Riedl et al. ............... 417/423.12 |
| 2013/0020898 | A1* | 1/2013 | Ryu et al. ................. 310/156.56 |

FOREIGN PATENT DOCUMENTS

| JP | 2005-210855 | 8/2005 |
| JP | 2005-295744 | 10/2005 |
| JP | 2014-072904 | 4/2014 |

* cited by examiner

*Primary Examiner* — Jose Gonzalez Quinones
(74) *Attorney, Agent, or Firm* — Nixon & Vanderhye PC

(57) ABSTRACT

In a rotary electric machine having a rotor core of a skew structure, when one of the core blocks is sequentially stacked on the other of the core blocks to form a step skew, a communication reference groove is formed along an axial direction of the rotor core by aligning a side section of a short protruding section in one core block with a side section of the long protruding sections in the other core block, and by aligning a side section of a long protruding section in one core block with a side section of a short protruding section in the other core block. The core blocks are correctly stacked by aligning the side section of the long protruding sections with the side section of the short protruding sections.

6 Claims, 3 Drawing Sheets

ROTARY ELECTRIC MACHINE EQUIPPED WITH ROTOR CORE OF STEP SKEW STRUCTURE

CROSS-REFERENCE TO RELATED APPLICATION

This application is related to and claims priority from Japanese Patent Application No. 2012-214429 filed on Sep. 27, 2012, the contents of which are hereby incorporated by reference.

BACKGROUND OF THE INVENTION

1. Field of the Invention

The present invention relates to rotary electric machines having a rotor core comprised of at least two or more core blocks. The core blocks are sequentially stacked in an axial direction of the rotor core. Each of the core blocks has a predetermined thickness. The assembly of the core blocks has a step skew structure in which the core blocks are shifted to each other in a circumferential direction by a skew having a predetermined phase angle of $\alpha$ (skew angle of $\alpha$).

2. Description of the Related Art

A technique regarding a step skew structure is applied to rotary electric machines in order to obtain torque ripple reduction and magnetic noise reduction.

Such a step skew structure of the rotor core in the rotary electric machine is shown by a skew angle of $\alpha$ formed between the first core block and the second core block and a skew angle of $\alpha$ formed between the second core block and the third core block. In order to make a step skew structure in the rotor core, the first core block, the second core block and the third core block are sequentially stacked so that they are shifted to each other by the skew angle of $\alpha$. Each of the first core block, the second core block and the third core block is comprised of a plurality of core sheets which are sequentially stacked, and a reference groove is formed on a central position P of a magnetic pole in the core sheets. In particular, the central position P of the magnetic pole is positioned on a half of the skew angle of $\alpha$.

The second core block is obtained by reversing the first core block. The second core block is stacked on the third core block, and the first core block is stacked on the second core block. That is, in the rotor core, the first core block and the third core block are arranged in the same direction. On the other hand, a front part of the second core block is reversed in arrangement direction to the front part of the first core block and the front part of the third core block because the second core block is reversed in arrangement position to the first core block.

A burr is generated in each of the core sheets toward a punching direction by punching a steel sheet, and the burrs of the core sheets in each of the core blocks have the same direction. Further, the first core block and the second core block are stacked so that the direction of the burrs of the core sheets in the first core block is reversed in arrangement direction to the direction of the burrs of the core sheets in the second core blocks. The second core block and the third core blocks are stacked in the same arrangement direction. As a result, the burrs of the core sheets in the first core block and the burrs of the core sheets in the third core blocks have the same direction. On the other hand, the direction of the burrs of the core sheets in the second core blocks is different, i.e. reversed to the direction of the burrs of the core sheets in the first core block and the third core block. In other words, the burrs of the core sheets in the second core block are reversely arranged in direction to the burrs of the core sheets in the first core block and the third core block along an axial direction of the rotor core. This arrangement of the burrs generates a gap between the first core block and the second core block, and further generates a gap between the second core block and the third core block in the rotor core. A prior patent document, a Japanese patent laid open publication No. 2005-295744 discloses this conventional problem.

As previously described, such a gap is generated between the sequentially stacked core blocks in a step skew structure because the burrs of the core sheets in the first core block are reversed in arrangement direction to the burrs of the core sheets in the second core block, and the burrs of the core sheets in the second core block are reversed in arrangement direction to the burrs of the core sheets in the third core block. As a result, this causes a possibility of foreign matter entering the inside of the rotor core through the gap, and of separating fixing members which fix permanent magnets to the rotor core from the rotor core.

SUMMARY

It is therefore desired to provide a rotary electric machine comprised of a stator, a rotary shaft, and a rotor core capable of easily stacking core blocks in a step skew structure and decreasing a gap formed between the stacked core blocks.

An exemplary embodiment provides a rotary electric machine comprised of a stator, a rotary shaft and a rotor core. The rotor core is rotatably arranged in an inside hole formed in the stator so that the rotor core is separated from an inner circumferential surface of the stator core by a predetermined gap. The rotor core is comprised of a plurality of core blocks stacked in an axial direction thereof. The core blocks form a step skew by a predetermined skew angle of $\alpha$ in a circumferential direction of the rotor core. Each of the core blocks is comprised of a central opening hole, short protruding sections and long protruding sections. The central opening hole is formed in a central part of each of the core blocks. The short protruding sections are protruded toward a radially inner side of each of the core blocks on a vertical line which connects a central point of a corresponding magnetic pole formed in an inside area of each of the core blocks to a central point of the central opening hole. The short protruding sections face the central opening hole. The long protruding sections are formed adjacent to the short protruding sections in a circumferential direction of the rotor core. The long protruding sections are protruded toward the radially inner side of each of the core blocks on a vertical line which connects a central point of the corresponding magnetic pole formed in the inside area of each of the core blocks to the central point of the central opening hole. The long protruding sections face the central opening hole. A central angle of a top section of each of the long protruding sections is greater than a central angle of a top section of each of the short protruding sections. For example, when a first core block in the core blocks is sequentially stacked on a second core block in the core blocks to form the step skew, a communication reference groove is formed along an axial direction of the rotor core by aligning a side section of the short protruding sections of one core block with a side section of the long protruding sections of the other core block, and by aligning a side section of the long protruding sections of one core block with a side section of the short protruding sections of the other core block.

According to the exemplary embodiment of the rotary electric machine, when a first core block is sequentially stacked on a second core block to form a step skew structure, the communication reference groove is formed along an axial direction of the rotor core by aligning a side section x1 of the short protruding sections 8 formed in the first core block 1 with a side section x22 of the long protruding sections 99 formed in the second core block 2, and aligning a side section x2 of the long protruding section 9 in the first core block 1 with a side section x11 of the short protruding section 88 of the second core block 2. This improved and superior structure makes it possible to easily and correctly stack the core blocks by using the communication reference groove, without reversing any core block in arrangement direction along an axial direction of the rotor core. Further, this makes it possible to decrease a size of the gap formed between the core blocks in the step skew structure.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
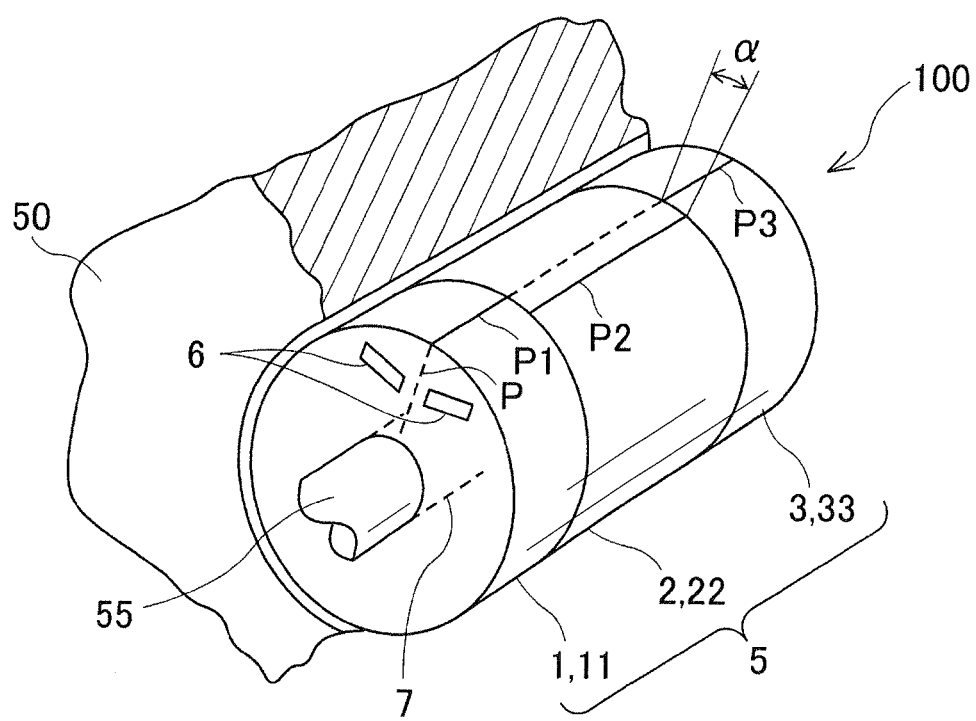
FIG. 1 is a schematic perspective view showing a partial structure of a rotary electric machine, i.e. showing a rotor core 5, a rotary shaft 55 and a stator 50 in a rotary electric machine according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of a structure and effects of a rotary electric machine according to an exemplary embodiment with reference to FIG. 1 to FIG. 4.

Figure 2:
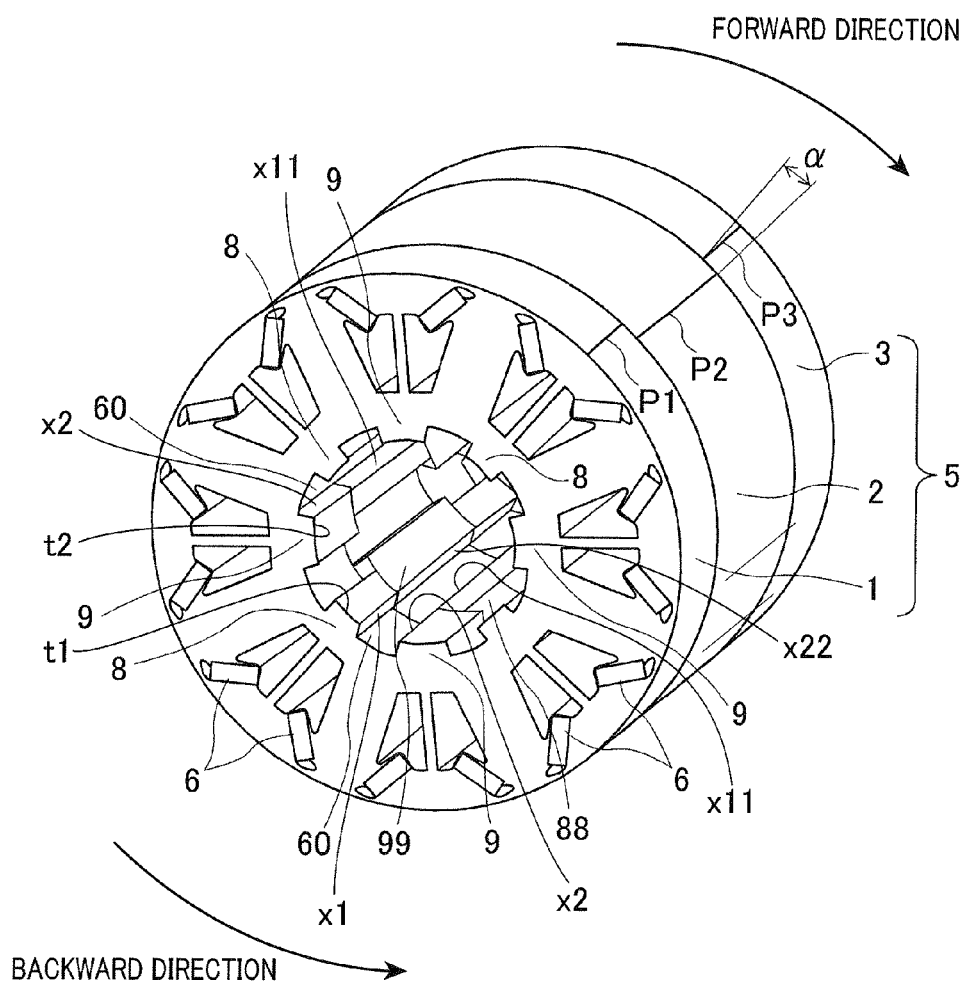
FIG. 2 is a perspective view showing the rotor core 5 before the rotary shaft 55 is inserted into the rotor core 5 in the rotary electric machine according to the exemplary embodiment.

FIG. 1 is a schematic perspective view showing a partial structure of a rotary electric machine, i.e. showing a rotor core 5, a rotary shaft 55 and a stator 50 in the rotary electric machine according to an exemplary embodiment. FIG. 2 is a perspective view showing the rotor core 5 before the rotary shaft 55 is inserted into a central hole 7 of the rotor core 5 in the rotary electric machine according to the exemplary embodiment.

As shown in FIG. 1 and FIG. 2, the rotor core 5 is arranged in an inside hole of the stator 50 while the rotor core 5 is separated from the stator 50 at a predetermined gap and the rotor core 5 is rotatably supported by the rotary shaft 55.

The rotor core 5 is comprised of a first core block 1, a second core block 2 and a third core block 3. The first core block 1, the second core block 2 and the third core block 3 are sequentially stacked so that the central hole 7 of each of the first core block 1, the second core block 2 and the third core block 3 are correctly arranged along an axial direction of the rotor core 5. The central hole 7 is surrounded or formed by a top section t1 of each of short protruding sections 8 and a top section t2 of each of long protruding sections 9, as shown in FIG. 2.

The first core block 1, the second core block 2 and the third core block 3 have the same shape excepting a thickness thereof. In the structure of the rotary electric machine according to the exemplary embodiment, the rotor core 5 is comprised of three core blocks such as the first core block 1, the second core block 2 and the third core block 3. However, it is possible that the rotor core is comprised of two or more than three core blocks which are sequentially stacked.

The rotary shaft 55 is inserted into the central hole 7 of the rotor core 5. The first core block 1, the second core block 2 and the third core block 3 are assembled together through the rotary shaft 55, and the first core block 1, the second core block 2 and the third core block 3 are fixed to the rotary shaft 55. Stator coils (not shown) are wound around the stator 50. When electric power is supplied to the stator coils, magnetic field is generated in the stator 50, and the generated magnetic field generates electromagnetic force in the rotor core 5. The generated electromagnetic force generates a torque of the rotor core 5 and the generated torque is transmitted to the rotary shaft 55.

Each of the first core block 1, the second core block 2 and the third core block 3 is a solid torus body, and has a plurality of magnetic central points P. The magnetic central points P equally divide a circumference of each of the first core block 1, the second core block 2 and the third core block 3. In particular, FIG. 1 shows one magnetic central point P and one pair of permanent magnets 6 only, for brevity and clear understanding. The permanent magnets 6 are arranged at the right side (toward a forward rotation direction) and the left side (toward a backward rotation direction) of the magnetic central point P, respectively, which are separated by the same angle from each magnetic central point P. As shown in FIG. 1 and FIG. 2, the permanent magnets 6 are embedded in the rotor core 5. However, it is possible that the permanent magnets 6 adhere to the outer peripheral surface of the rotor core 5.

An extension line P1 is a vertical line to be introduced for easy explanation and understanding, which is extended from the magnetic central point P along the outer peripheral surface of the first core block 1. Similar to the extension line P1, an extension line P2 is a vertical line introduced for easy explanation and understanding, which is extended from the magnetic central point P along the outer peripheral surface of the second core block 2. Like the extension line P2, an extension line P3 is a vertical line introduced for easy explanation and understanding, which is extended from the magnetic central point P along the outer peripheral surface of the third core block 3.

The first core block 1 and the second core block 2 are stacked in an axial direction of the rotor core 5 so that the extension line P1 of the first core block 1 and the extension line P2 of the second core block 2 make a step skew in a circumferential direction of the rotor core 5 by a skew angle of α. Similarly, the second core block 2 and the third core block 3 are stacked in an axial direction of the rotor core 5 so that the extension line P2 of the second core block 2 and the extension line P3 of the third core block 3 make a step skew in a circumferential direction of the rotor core 5 by a skew angle of α.

The first core block 1 is comprised of a plurality of first core sheets 11. The first core sheets 11 are stacked. The second core block 2 is comprised of a plurality of second core sheets 22. The second core sheets 22 are stacked. The third core block 3 is comprised of a plurality of third core sheets 33. The third core sheets 33 are stacked. Each of the first core sheets 11, the second core sheets 22 and the third core sheets 33 has the same shape and size and is produced by punching electrical steel sheets. When punching an electrical steel sheet to produce each of the first core sheets 11, the second core sheets 22 and the third core sheets 33, the short protruding section 8, the long protruding section 9 and inserting holes for the permanent magnets 6 are formed in each core sheet, simultaneously.

Figure 3:
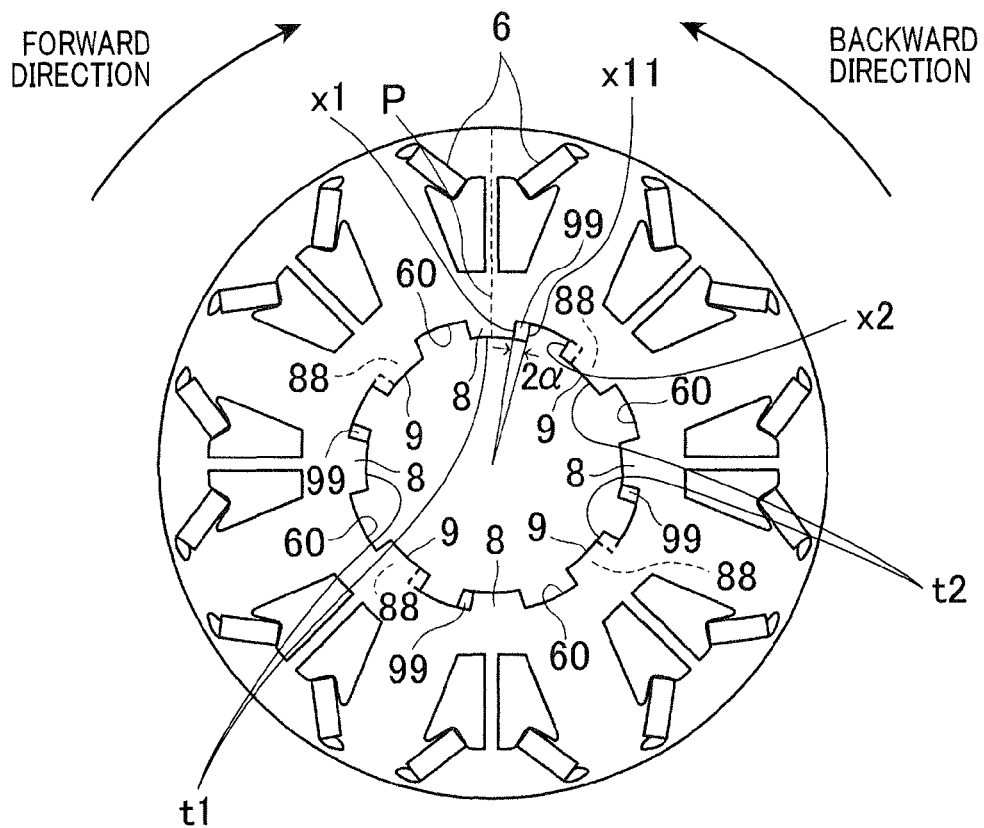
FIG. 3 is a front view showing a first core block 1 and a second core block 2 which are stacked in the rotor core 5 when observed from the first core block 1 side.

FIG. 3 is a front view showing the first core block 1 and the second core block 2 which are stacked in the rotor core 5 when observed from the first core block 1 side.

As shown in FIG. 2 and FIG. 3, each of the short protruding sections 8 and the long protruding sections 9 has approximately a trapezoid shape. Each of the short protruding section 8 and the long protruding section 9 protrudes toward a radially inside direction of the central hole 7 in the core sheet at a central position P of each magnet pole so that the short protruding section 8 and the long protruding section 9 are alternately formed in each core block at the central hole 7 side along the inner circumferential direction of each core block. In the rotary electric machine according to the exemplary embodiment, it is so designed that a central angle at the top section t2 of the long protruding section 9 is greater than a central angle at the top section t1 of the short protruding section 8. In particular, a difference between the central angle at the top section t1 of the short protruding section 8 and the central angle at the top section t2 of the long protruding section 9 is twice a skew angle α. It is preferable to have a structure in which the number of the short protruding sections 8 is an even number and the number of the long protruding sections 9 is an even number, and the total sum of the number of the short protruding sections 8 and the number of the long protruding sections 9 becomes equal to the number of magnetic poles. However, it is possible to arrange each of the protruding sections having a smaller number at the central position P of the corresponding magnet pole 6.

Figure 4:
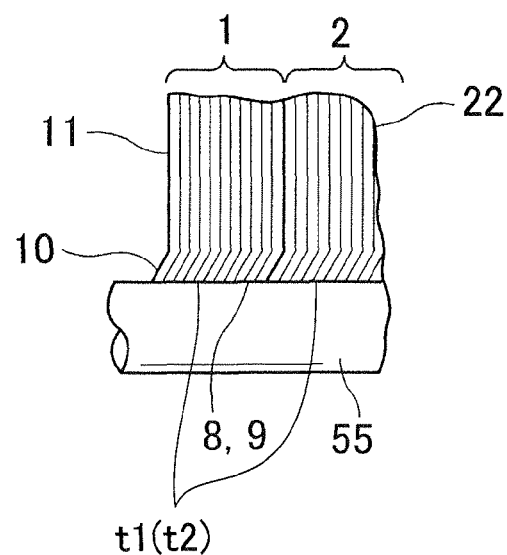
FIG. 4 is a cross section of a front part of the rotor core 5 when the rotary shaft 55 is inserted into the rotor core 5 in the rotary electric machine according to the exemplary embodiment of the present invention.

FIG. 4 is a cross section of a front part of the rotor core 5 when the rotary shaft 55 is inserted to the rotor core 5 in the rotary electric machine according to the exemplary embodiment of the present invention. In general, burrs 10 are generated at the top section t1, t2 and side sections x1, x2 of each of the short protruding section 8 and the long protruding section 9 when a punching process works electrical steel sheets.

As shown in FIG. 4, the burrs 10 are generated toward a punching direction when an electrical steel sheet is punched to produce each of the first core sheets 11, the second core sheets 22 and the third core sheets 33.

When the first core sheets 11 with the burrs 10, the second core sheets 22 with the burrs 10 and the third core sheets 33 with the burrs 10 are stacked to produce the first core block 1, the second core block 2 and the third core block 3 in the rotor core 5, one or both of the short protruding section 8 and the long protruding section 9 are used as reference sections to correctly stack the first core sheets 11 with the burrs 10, the second core sheets 22 with the burrs 10 and the third core sheets 33 with the burrs 10 so that the protruding direction of the burrs 10 in each of the core sheets is aligned to the same direction, as shown in FIG. 4. It is possible to form each core block by using another method of stacking core sheets (which will be explained later).

In order to produce a step skew between the first core block 1 and the second core block 2, the second core block 2 is stacked on the first core block 1 by shifting the second core block 2 from the first core block 1 by a skew angle of α, the following process is performed.

As shown in FIG. 3, the side sections x1, x2 of the short protruding section 8 and the long protruding section 9 of the first core block 1 are aligned with the side sections x11, x22 of the long protruding section 99 and the short protruding section 88 of the second core block 2, respectively. That is, a communication reference groove 60 is formed by using (a) the side section x2 (at the forward rotation side of the rotor core 5) of the long protruding section 9 of the first core block 1 is aligned with (b) the side section x11 (at the forward rotation side of the rotor core 5) of the short protruding section 88 of the second core block 2, and (c) the side section x1 (at the backward rotation side of the rotor core 5) of the short protruding section 8 of the first core block 1 is aligned with (d) the side section x22 (at the backward rotation side of the rotor core 5) of the long protruding section 99 of the second core block 2.

Because the communication reference groove 60 is straightly formed in the first core block 1 and the second core block 2 along an axial direction of the first core block 1 and the second core block 2 when the first core block 1 and the second core block 2 are assembled together, it is possible for the communication reference grooves 60 to guide a dig tool in order to correctly stack the first core block 1 on the second core block 2. That is, the presence of the communication reference grooves 60 makes it possible to easily stack the first core block 1 and the second core block 2 in a skew arrangement. The second core block 2 and the third core block 3 are assembled by the same method previously described.

In the structure of the rotary electric machine according to the exemplary embodiment shown in FIG. 2 and FIG. 3, the number of the communication reference grooves 60 is four when the number of the magnetic poles 6 is eight.

Although the number of the communication reference grooves 60 corresponds to the number of pairs of the short protruding section 8 and the long protruding section 9, it is preferable to have at least two communication reference grooves 60 in order to easily and correctly guide the jig tool when the core blocks are stacked.

In order to produce a step skew between the second core block 2 and the third core block 3, the third core block 3 is stacked on the second core block 3 by shifting the third core block 3 from the second core block 2 by a skew angle of α, communication reference grooves are formed by using the side sections (not shown) of the long protruding section and the short protruding sections formed in the second core block 2 and the third core block 3 so that the skew angle between the second core block 2 and the third core block 3 is reversed from the skew angle between the first core block 1 and the second core block 2.

The step skew having the skew angle S is formed between the first core block 1 and the second core block 2, and the step skew having the skew angle S is also formed between the second core block 2 and the third core block 3, as previously described, while the burrs 10 formed at the front section of each of the first core block 1, the second core block 2 and the third core block 3 are aligned in the same direction.

As previously described in detail, according to the rotary electric machine of the exemplary embodiment, the first core block 1, the second core block 2 and the third core block 3 are stacked to produce a step skew. When the side sections x1, x2 of the short protruding section 8 and the long protruding section 9 of the first core block 1 are aligned with the side sections x11, x22 of the short protruding section 88 and the long protruding section 99 of the second core block 2, the communication reference groove 60 is formed in an axial direction by the side sections x1, x2, x11, x22 of the short protruding sections 8 and 88 and the long protruding sections 9 and 99. This makes it possible to correctly and easily stack the core blocks by using the communication reference grooves 60 as a guiding tool of the jig tool during the production of the rotary electric machine according to the exemplary embodiment, i.e. possible to stack the core blocks in the same surface direction of the core block without using a conventional method of stacking a first core block and a second core block, where the second core block is reversely arranged to the first core block.

Still further, the structure of the rotary electric machine according to the exemplary embodiment makes it possible to decrease a gap between the core blocks which makes a step skew.

Still further, the short protruding sections 8 (88) and the long protruding sections 9 (99) are alternately formed in each core block at the central hole 7 side along the inner circumferential direction of the core block and each of the short protruding sections 8 (88) and the long protruding sections 9 (99) is formed at the central position P of each magnet pole. This makes it possible to stack the core sheets at a desired position on the core sheets. This makes it possible to avoid an influence caused by a difference in thickness between core sheets.

Still further, because a difference between the central angle at the top section t1 of the short protruding section 8 and the central angle at the top section t2 of the long protruding section 9 is twice a skew angle α, it is possible to easily form the communication reference groove 60, in each core block to be stacked, at the position which is separated from the central position P of each magnet pole by a skew angle of α

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A rotary electric machine, comprising: a stator; a rotary shaft; and a rotor core, wherein:
    the rotor core is rotatably arranged in an inside hole formed in the stator so that the rotor core is separated from an inner circumferential surface of the stator core by a predetermined gap,
    the rotor core comprises a plurality of core blocks stacked in an axial direction of the rotor core and forming a step skew by a predetermined skew angle of α in a circumferential direction of the rotor core, each of the core blocks comprises:
    a central opening hole formed in a central part of each of the core blocks;
    short protruding sections which are protruded toward a radially inner side of each of the core blocks and face the central opening hole, on a vertical line which connects a central point of a corresponding magnetic pole formed in an inside area of each of the core blocks to a central point of the central opening hole; and
    long protruding sections which are formed adjacent to the short protruding sections in a circumferential direction of the rotor core, and protruded toward the radially inner side of each of the core blocks and face the central opening hole, on a vertical line which connects a central point of the corresponding magnetic pole formed in the inside area of each of the core blocks to the central point of the central opening hole, and
    a central angle of a top section of each of the long protruding sections is greater than a central angle of a top section of each of the short protruding sections,
    when one of the core blocks is sequentially stacked on the other of the core blocks to form the step skew, a communication reference groove is formed along an axial direction of the rotor core by aligning a side section of the short protruding sections in one core block with a side section of the long protruding sections in the other core block, and aligning a side section of the long protruding section in one core block with a side section of the short protruding section in the other core block, and
    a difference between a central angle of a top section of each of the short protruding sections and a central angle of a top section of each of the long protruding sections is twice the predetermined skew angle of α.

2. The rotary electric machine according to claim 1, wherein the number of the short protruding sections is an even number and the number of the long protruding sections is an even number, and a total sum of the number of the short protruding sections and the number of the long protruding sections is equal to the number of the magnetic poles formed in an inside area of each of the core blocks.

3. A rotary electric machine, comprising: a stator; a rotary shaft; and a rotor core, wherein:
    the rotor core is rotatably arranged in an inside hole formed in the stator so that the rotor core is separated from an inner circumferential surface of the stator core by a predetermined gap,
    the rotor core comprises a plurality of core blocks stacked in an axial direction of the rotor core and forming a step skew by a predetermined skew angle of α in a circumferential direction of the rotor core, each of the core blocks comprises:
    a central opening hole formed in a central part of each of the core blocks;
    short protruding sections which are protruded toward a radially inner side of each of the core blocks and face the central opening hole, on a vertical line which connects a central point of a corresponding magnetic pole formed in an inside area of each of the core blocks to a central point of the central opening hole; and
    long protruding sections which are formed adjacent to the short protruding sections in a circumferential direction of the rotor core, and protruded toward the radially inner side of each of the core blocks and face the central opening hole, on a vertical line which connects a central point of the corresponding magnetic pole formed in the inside area of each of the core blocks to the central point of the central opening hole, and
    a central angle of a top section of each of the long protruding sections is greater than a central angle of a top section of each of the short protruding sections,
    when one of the core blocks is sequentially stacked on the other of the core blocks to form the step skew, a communication reference groove is formed along an axial direction of the rotor core by aligning a side section of the short protruding sections in one core block with a side section of the long protruding sections in the other core block, and aligning a side section of the long protruding section in one core block with a side section of the short protruding section in the other core block,
    the short protruding sections and the long protruding sections are alternately arranged in a circumferential direction of the core blocks on the central point of all of the magnetic poles formed in the inside area of each of the core blocks, and a difference between a central angle of a top section of each of the short protruding sections and a central angle of a top section of each of the long protruding sections is twice the predetermined skew angle of α.

4. The rotary electric machine according to claim 3, wherein the number of the short protruding sections is an even number and the number of the long protruding sections is an even number, and a total sum of the number of the short protruding sections and the number of the long protruding sections is equal to the number of the magnetic poles formed in an inside area of each of the core blocks.

5. A rotary electric machine, comprising: a stator; a rotary shaft; and a rotor core, wherein
- the rotor core is rotatably arranged in an inside hole formed in the stator so that the rotor core is separated from an inner circumferential surface of the stator core by a predetermined gap,
- the rotor core comprises a plurality of core blocks stacked in an axial direction of the rotor core and forming a step skew by a predetermined skew angle of α in a circumferential direction of the rotor core, each of the core blocks comprises:
- a central opening hole formed in a central part of each of the core blocks;
- short protruding sections which are protruded toward a radially inner side of each of the core blocks and face the central opening hole, on a vertical line which connects a central point of a corresponding magnetic pole formed in an inside area of each of the core blocks to a central point of the central opening hole; and
- long protruding sections which are formed adjacent to the short protruding sections in a circumferential direction of the rotor core, and protruded toward the radially inner side of each of the core blocks and face the central opening hole, on a vertical line which connects a central point of the corresponding magnetic pole formed in the inside area of each of the core blocks to the central point of the central opening hole, and
- a central angle of a top section of each of the long protruding sections is greater than a central angle of a top section of each of the short protruding sections, wherein:
- when one of the core blocks is sequentially stacked on the other of the core blocks to form the step skew, a communication reference groove is formed along an axial direction of the rotor core by aligning a side section of the short protruding sections in one core block with a side section of the long protruding sections in the other core block, and aligning a side section of the long protruding section in one core block with a side section of the short protruding section in the other core block, and
- the number of the short protruding sections is an even number and the number of the long protruding sections is an even number, and a total sum of the number of the short protruding sections and the number of the long protruding sections is equal to the number of the magnetic poles formed in an inside area of each of the core blocks.

6. A rotary electric machine, comprising: a stator; a rotary shaft; and a rotor core, wherein:
- the rotor core is rotatably arranged in an inside hole formed in the stator so that the rotor core is separated from an inner circumferential surface of the stator core by a predetermined gap,
- the rotor core comprises a plurality of core blocks stacked in an axial direction of the rotor core and forming a step skew by a predetermined skew angle of α in a circumferential direction of the rotor core, each of the core blocks comprises:
- a central opening hole formed in a central part of each of the core blocks;
- short protruding sections which are protruded toward a radially inner side of each of the core blocks and face the central opening hole, on a vertical line which connects a central point of a corresponding magnetic pole formed in an inside area of each of the core blocks to a central point of the central opening hole; and
- long protruding sections which are formed adjacent to the short protruding sections in a circumferential direction of the rotor core, and protruded toward the radially inner side of each of the core blocks and face the central opening hole, on a vertical line which connects a central point of the corresponding magnetic pole formed in the inside area of each of the core blocks to the central point of the central opening hole, and
- a central angle of a top section of each of the long protruding sections is greater than a central angle of a top section of each of the short protruding sections,
- when one of the core blocks is sequentially stacked on the other of the core blocks to form the step skew, a communication reference groove is formed along an axial direction of the rotor core by aligning a side section of the short protruding sections in one core block with a side section of the long protruding sections in the other core block, and aligning a side section of the long protruding section in one core block with a side section of the short protruding section in the other core block,
- the short protruding sections and the long protruding sections are alternately arranged in a circumferential direction of the core blocks on the central point of all of the magnetic poles formed in the inside area of each of the core blocks, and
- the number of the short protruding sections is an even number and the number of the long protruding sections is an even number, and a total sum of the number of the short protruding sections and the number of the long protruding sections is equal to the number of the magnetic poles formed in an inside area of each of the core blocks.

* * * * *